July 11, 1967      R. F. JAMES      3,330,396
COIN OPERATED EMBOSSING MACHINE WITH RATCHET TO
PREDETERMINE MAXIMUM NUMBER OF LETTERS
Filed Dec. 7, 1964      6 Sheets-Sheet 1

RICHARD F. JAMES
INVENTOR.

BY Allen and Cromy
ATTORNEYS

INVENTOR
RICHARD F. JAMES
BY Allen and Chromy
ATTORNEYS

July 11, 1967  R. F. JAMES  3,330,396
COIN OPERATED EMBOSSING MACHINE WITH RATCHET TO
PREDETERMINE MAXIMUM NUMBER OF LETTERS
Filed Dec. 7, 1964  6 Sheets-Sheet 5

RICHARD F. JAMES
INVENTOR.

BY Allen and Chromy
ATTORNEYS

United States Patent Office 3,330,396
Patented July 11, 1967

3,330,396
COIN OPERATED EMBOSSING MACHINE WITH RATCHET TO PREDETERMINE MAXIMUM NUMBER OF LETTERS
Richard F. James, 176 Loma Alto Ave., Los Gatos, Calif. 95030
Filed Dec. 7, 1964, Ser. No. 416,550
15 Claims. (Cl. 197—6.4)

This invention relates to a coin-operated lettering and embossing device.

An object of this invention is to provide an improved lettering and embossing device using pressure-sensitive embossing tape.

Still another object of this invention is to provide a lettering and embossing device in the form of a vending machine that is coin-operated or controlled.

Still another object of this invention is to provide a coin-controlled lettering and embossing device that is constructed to produce a label containing up to a predetermined number of letters which may be selected by the operator after a predetermined coin is inserted into the device.

Still another object of this invention is to provide a coin-operated lettering and embossing device in which a label containing a predetermined number of letters may be produced after inserting a predetermined coin and which may be made to include additional letters upon inserting one or more additional coins successively.

Still another object of this invention is to provide an improved lettering and embossing device for making labels on pressure-sensitive embossing tape, said device being provided with a shaft actuated by the operator for rotating a cam which operates the embossing mechanism and also for rotating a cam which operates the tape-severing mechanism after the desired number of letters are embossed on the tape, said tape-severing mechanism being operable only after the tape is shifted a predetermined number of letter spaces from the last letter embossed thereon.

Still another object of this invention is to provide a semi-automatic lettering and embossing device using pressure-sensitive tape, said device being provided with an automatic ratchet mechanism which functions to count the number of letters embossed in each label and which returns to its initial setting after the label is severed from the tape supply, irrespective of whether the label contains a predetermined number of letters or less.

Still another object of this invention is to provide a coin-operated lettering and embossing device which is substantially tamper-proof in that the pressure-sensitive tape cannot be fed therefrom unless a coin is inserted therein.

Other and further objects of this invention will be apparent to those skilled in the art to which it relates from the following specifications, claims and drawings in which, briefly:

FIG. 7b is a sectional view taken along the line 7b—7b of FIG. 6a;
FIG. 8 is a sectional view taken along the line 8—8 of FIG. 6a;
FIG. 11 is a sectional view taken along the line 11—11 of FIG. 2 showing the tape reel;
FIG. 13d is a top view of the mechanism in the position shown in FIG. 13a.

Figure 1:
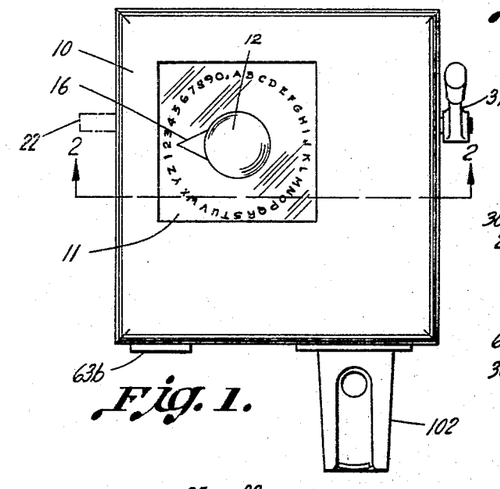
FIG. 1 is a top view of this apparatus.
Figures 2, 6:
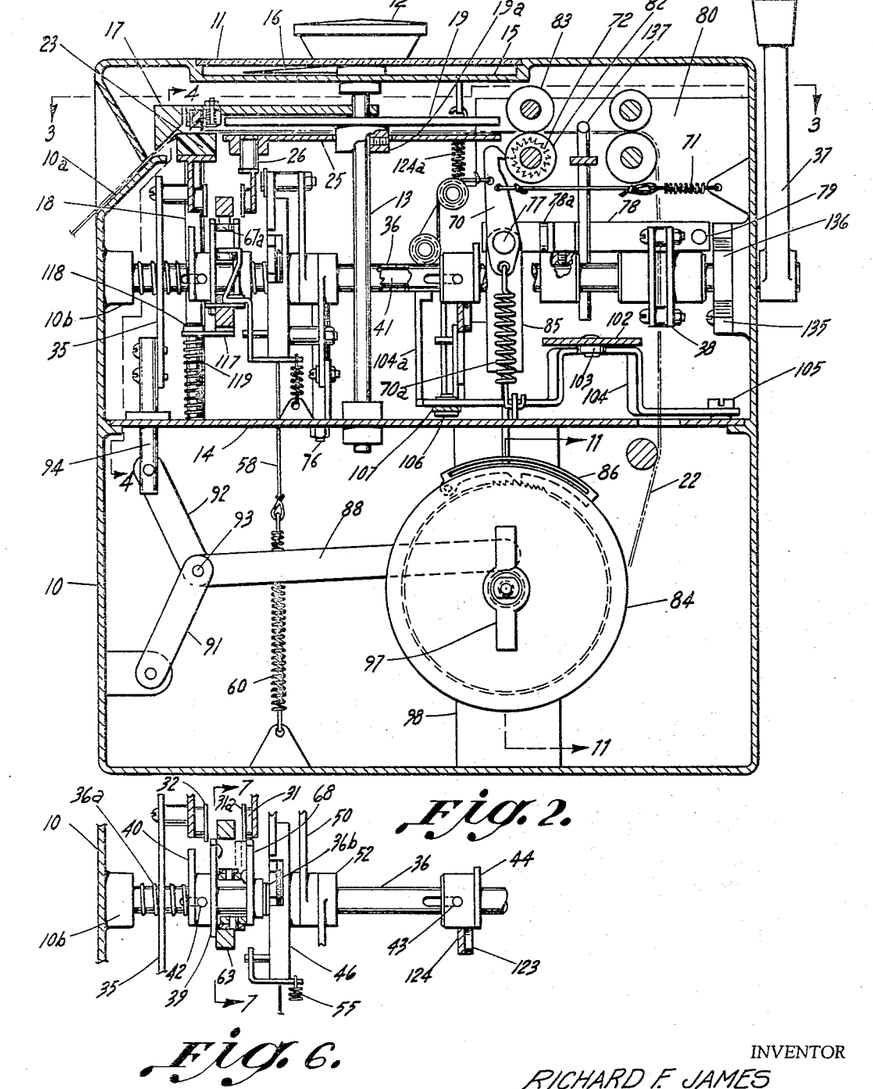
FIG. 2 is a sectional view taken along the line 2—2 of FIG. 1.
FIG. 6 is a partial view of the cam shaft showing the embossing cam in an operating position.
Figure 2A:
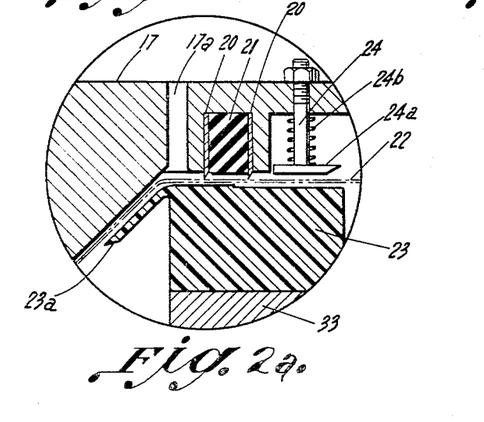
FIG. 2a is an enlarged view of the tape cut-off knives and anvil shown in FIG. 2.
Figure 4:
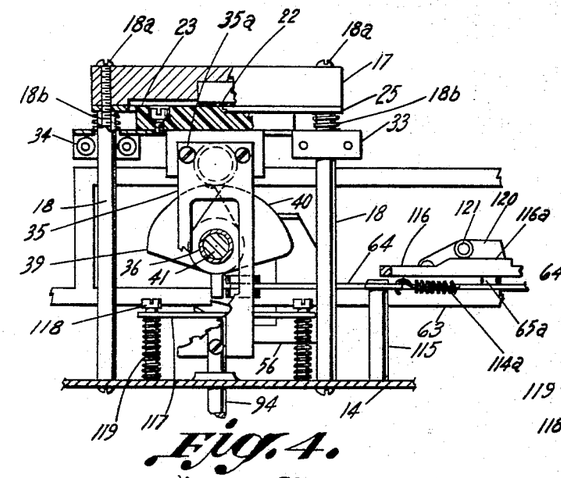
FIG. 4 is a sectional view taken along the line 4—4 of FIG. 2.

Referring to the drawing in detail, reference numeral 10 designates the housing of this apparatus. The top view of this housing shown in FIG. 1 shows the window 11 and letter or number selecting knob 12 projecting above the window. The knob 12 is attached to a shaft 13 that extends into the housing and is journaled in plate 14, as shown in FIG. 2. The housing is provided with a depressed panel section 15 which is positioned directly below the window 11 and has embossed thereon the different letters and numbers. These numbers and letters may be silk screened or painted on the panel 15. The knob 12 is provided with a pointer 16 to indicate which letter or number was selected by the operator. The shaft 13 is also journaled in bracket member 17 which is supported by the pins 18, as shown in FIG. 4, and the lower ends of these pins 18 are attached to the plate 14 by means of suitable machine screws. The bracket 17 functions to hold the embossing wheel 19, shown in FIG. 2, in the correct position since it forms a bearing for the shaft 13. This embossing wheel is of conventional construction and it is provided with letters and numbers in relief on the bottom thereof. Bracket 17 also supports knives 20 shown in the enlarged view of FIG. 2a. These knives 20 are held in a recess in the bracket 17 by friction supplied by the spacer 21 which may be of rubber or like material, and which extends down toward the cutting edges of these knives a sufficient distance so that it functions as a tape stripper. The forward knife 20 is employed as a severing knife for the tape 22 and the rear knife 20 is positioned over a slight recess in the anvil 23 so that this knife only cuts part way into the tape to sever the coating over the adhesive surface of the tape and thus facilitate stripping this coating from the tape when the tape label is to be applied to the desired surface.

The forward part of the bracket 17 is provided with an angularly depending part that is just ahead of the slot 17a. The anvil 23 is made of plastic such as Delrin or the like, and it is provided with a spring tongue 23a which normally would rest against the underside of the angularly disposed tape being fed out of the recess 10a of the machine. Thus, if a person is trying to insert a thin blade into the feed-out recess 10a of the housing, if the blade is above the tape, it will be deflected into the slot 17a, whereas, if it is below the tape, the resilient finger 23a will deflect it toward the anvil 23. The bracket 17 also supports the stripper 24, shown in FIG. 2a, which is provided with a shoe 24a that is urged against the tape by the spring 24b so that the shoe 24a functions to guide the tape under the blades 20. The plate 25 is clamped between bracket 17 and pins 18, as shown in FIG. 4, by the screws 18a which extend into the pins 18 through holes formed in the bracket 17 and plate 25, as shown in FIG. 4.

Figures 7, 7A:
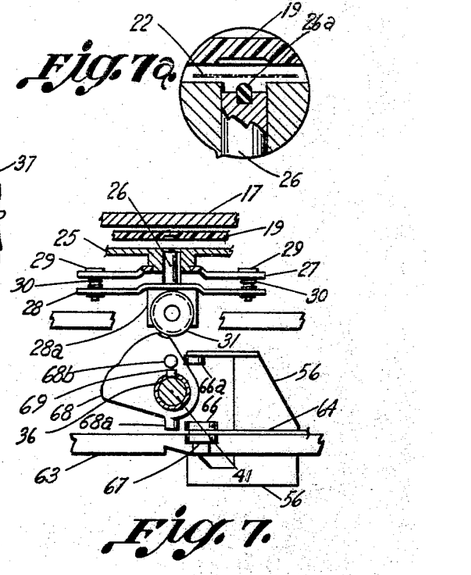
FIG. 7 is a sectional view taken along the line 7—7 of FIG. 6.
FIG. 7a is an enlarged view of the embossing pin.
Figure 7B:
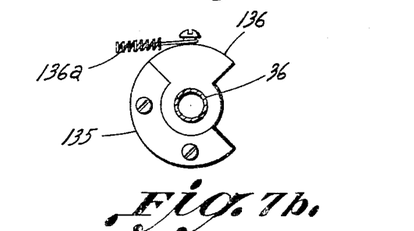

The embossing pin 26, which is shown in detail in FIGS. 7 and 7a, is supported on the plate 25 by brackets 27 and 28. This pin is provided with a rubber tip 26a and the pin 26 presses this tip against the tape 22 into the cavity of the selected character formed in relief on the underside of disc 19. Bracket 27 is welded to plate 25. Pins 29 are supported by the bottom bracket 28 and suitable springs 30 are positioned on the pins 29 to push the brackets 27 and 28 apart. The pins 29 are provided with heads on the upper part thereof to prevent the springs 30 from pulling these pins out of the bracket 27. A depending bracket 28a is attached to the bottom of bracket 28 and this depending bracket rotatably supports the cam follower roller 31, which is provided with a flange 31a, as shown in FIG. 6.

Figures 3, 6A:
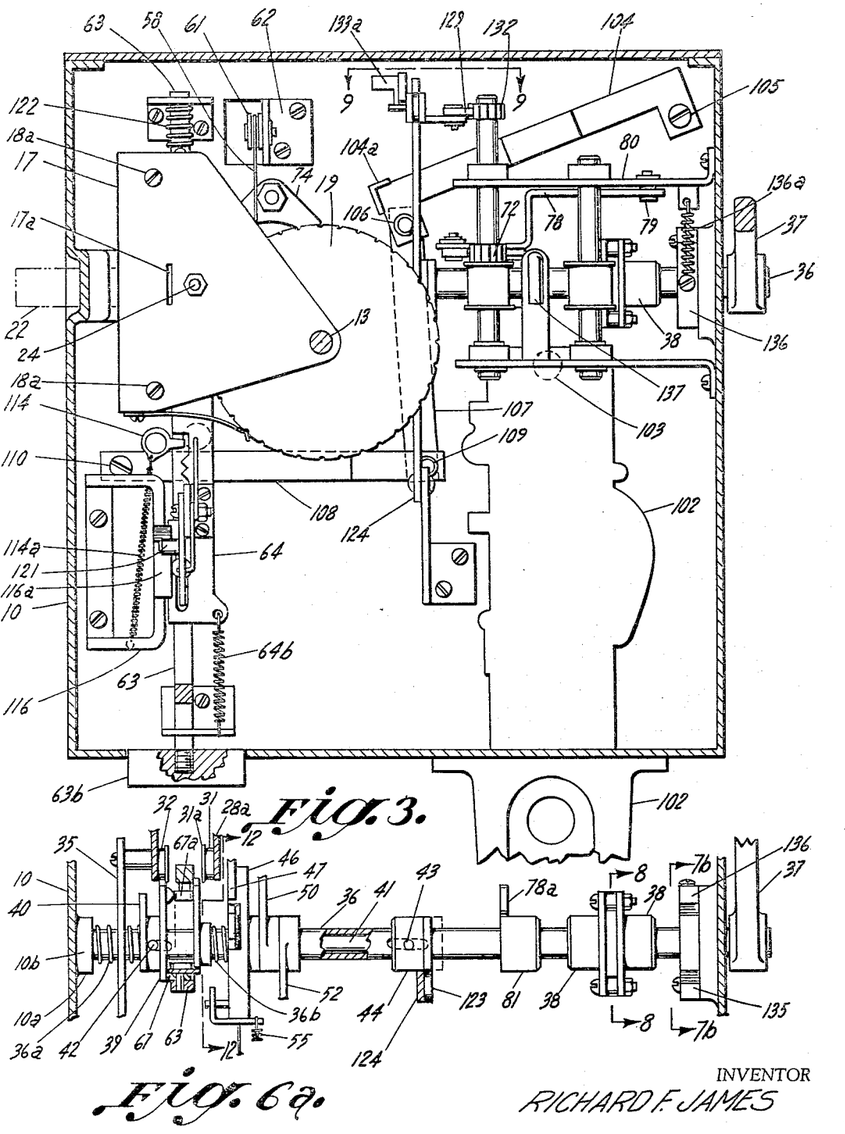
FIG. 3 is a sectional view taken along the line 3—3 of FIG. 2.
FIG. 6a is a view of the entire length of the cam shaft showing the position of the cut-off cams during tape cut-off. This view also shows the feed cam shifted to its operating position.
Figures 8, 11:
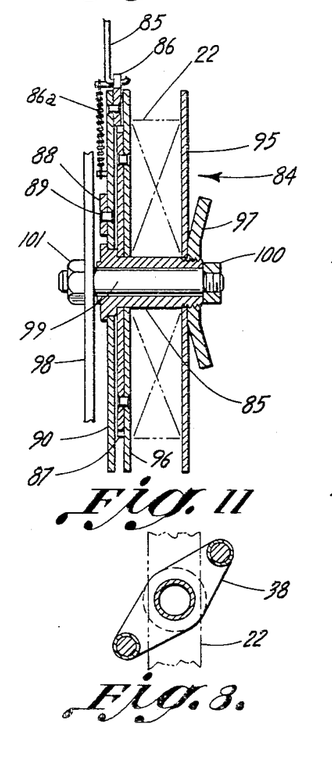

The cam follower roller 31 functions to raise the embossing pin 26 which presses the tape 22 against the embossing wheel 19. A similar cam follower roller 32 is provided for lifting the anvil 23, see FIGS. 2, 6 and 6a. The anvil 23 is attached to the member 33 by suitable screws as shown in FIG. 4. This member 33 is guided by pins 18, and for this purpose suitable rollers 34 are rotatably supported on depending brackets or side portions of member 33. A plate member 35 is attached to member 33 by suitable screws 35a. This plate member 35 is provided with a hole through which the shaft 36 extends into the journal 10b which is made integral with the case 10. The other end of the shaft extends out of the housing 10 and is provided with an actuating handle 37 which is fixedly attached thereto, as shown in FIGS. 2 and 6a. The shaft 36 is made in two parts and is joined by a coupling unit 38, as shown in FIGS. 6a and 8, so as to allow the tape 22 to be fed directly upwardly through the shaft 36, as shown in FIG. 2.

Figure 5:
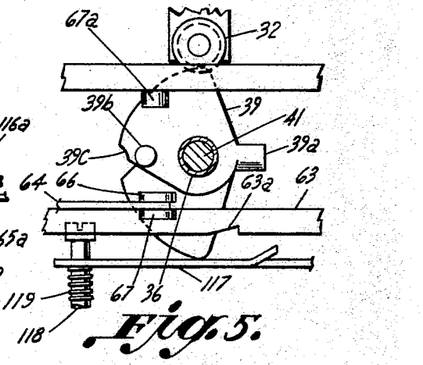
FIG. 5 is an operational view showing the cut-off cam of FIG. 4 in an operating position.
Figures 9, 9A:
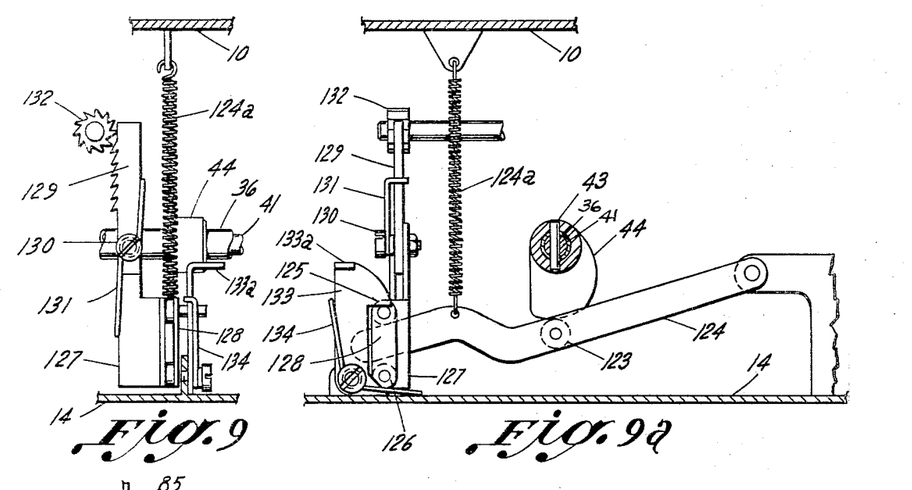
FIG. 9 is a sectional view taken along the line 9—9 of FIG. 3.
FIG. 9a is a side view of the operating linkage of the tape feeding mechanism shown in FIG. 9.

The cut-off cam 39 and release cam 40 are made as a unit, see FIG. 5, and they are slidably mounted on the shaft 36. The shaft 36 is hollow and a rod 41 is provided inside thereof. The cams 39 and 40 are attached to the rod 41 by the pin 42 which is slidable in short slots provided in the tubular shaft 36, as shown in FIGS. 6 and 6a. At the other end of the rod 41 there is provided a pin 43 which is used to attach the finish cut-off cam 44 thereto, as shown in FIG. 9a.

Figure 12:
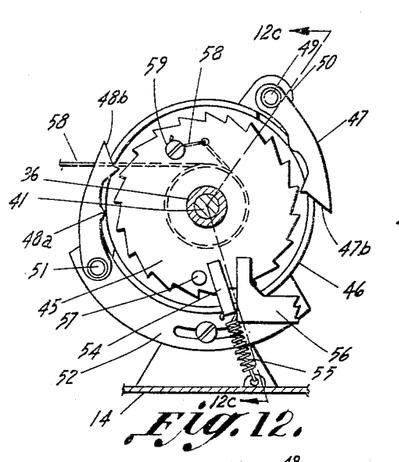
FIGS. 12, 12a and 12b are sectional views taken along the line 12—12 of FIG. 6a showing the ratchet mechanism in different operating positions.
Figure 12A:
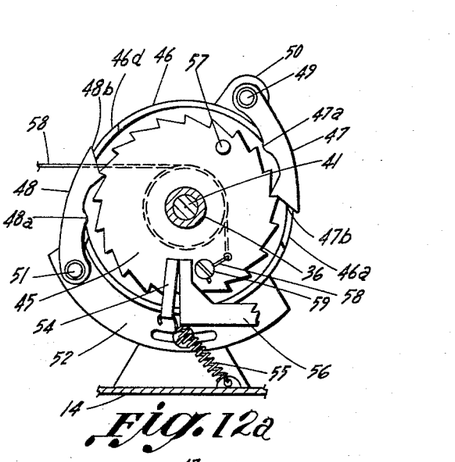
Figure 12B:
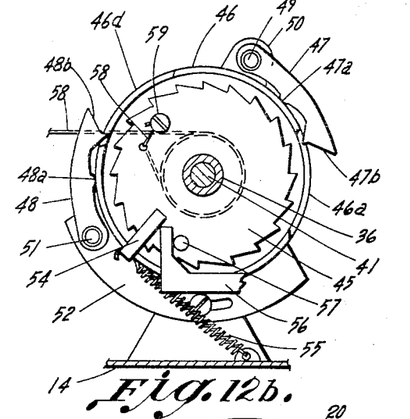
Figure 12C:
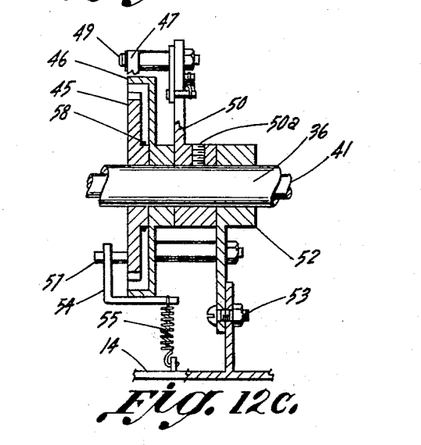
FIG. 12c is a sectional view taken along the line 12c—12c of FIG. 12.
Figure 13:
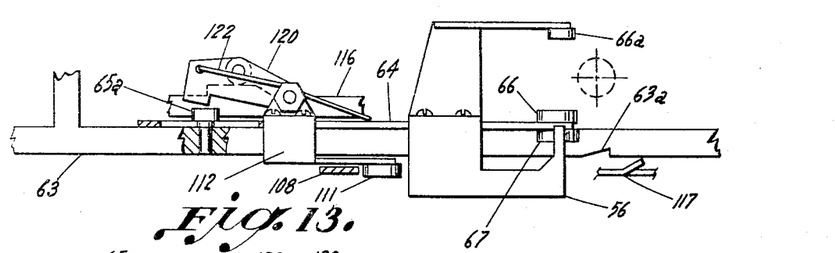
FIG. 13 is a side view of the cam shifting mechanism in neutral position.

The ratchet 45 is rotatably mounted on the shaft 36, as shown in FIGS. 12, 12a, 12b and 12c. This ratchet is provided with 21 teeth for counting the characters embossed on the tape by the operator, as described hereinafter. The ratchet 45 is located in the shroud 46 which is also rotatably mounted on the shaft 36. Sections 46a and 46b of the peripheral portions of the shroud 46 are cut away so that the teeth of the pawls 47 and 48 may enter the inside of the shroud and engage the teeth of the ratchet. Pawl 47 is rotatably supported on pin 49 which is fixedly attached to the arm 50 that is in turn fixedly attached to the shaft 36 by a set screw 50a, as shown in FIG. 12c. The pawl 47 is spring-urged toward the ratchet 45. Pawl 48 is pivotally supported by the pin 51 which extends to the member 52 and is fixedly attached thereto. The member 52 is in the shape of a segment, as shown in FIGS. 12 and 12b, and is provided with a slot for receiving the machine screw 53, whereby it is adjustably supported on the plate 14, as shown in FIGS. 2 and 12c. The finger 54 is attached to the periphery of the shroud 46 and a spring 55 is provided between this finger 54 and the plate 14. This spring 55 tends to rotate the shroud 46 to a particular position until the member 56 of the unlatching mechanism, shown in FIG. 13, is brought into engagement with this finger 54, as will be described hereinafter. Latching pin 57 is provided to the ratchet 45 substantially opposite the twenty-first tooth of this ratchet. This latching pin 57 is brought into engagement with the latching mechanism 56 as shown in FIG. 12b when the operator of this device has used up a predetermined number of characters, for example 20, in his label. It is noted that both of the pawls 47 and 48 are moved by the shroud 46 with their teeth out of engagement with the ratchet 45 when the latching pin 57 pushes the latching mechanism 56 to the position shown in FIG. 12b.

The cable 58 has a portion thereof wound around the hub of the ratchet 45 and one end of this cable is attached to the ratchet by the screw 59. The cable 58 is spring loaded by the spring 60, FIG. 2. One end of spring 60 is attached to the other end of cable 58 and the other end is attached to a projection provided on the inside of the housing 10. The cable 58 passes over a guiding pulley 61 which is attached to a bracket 62 that is attached to the plate 14.

It will be noted that each of the pawls 47 and 48 is provided with camming surfaces 48a and 48b. In the position shown in FIG. 12b the pawls 47 and 48 are out of engagement with the ratchet since the camming surfaces 47a and 48a thereof, respectively, are in engagement with the peripheral portions of the shroud 46. On the other hand, as shown in FIG. 12, the camming surfaces 47b and 48b of pawls 47 and 48, respectively, are in engagement with edges of the cut-away portions of the periphery of the shroud 46, and thus these pawls are moved out of engagement with the ratchet 45. The ratchet 45 is shown in the neutral position in FIG. 12 with the latching pin 57 adjacent to the left-hand side of the finger 54. FIG. 12a shows the ratchet 45 in an operating position, at which approximately one-half of the alloted numbers or letters have been used by the operator in preparing his label.

Figure 3A:
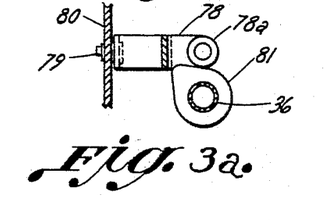
FIGURE 3a is a detail of a cam for actuating a tape feed mechanism.
Figures 10, 10A:
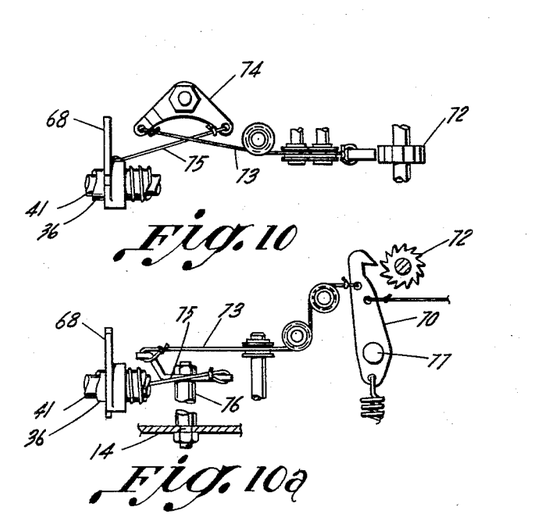
FIGS. 10 and 10a are detail views showing the single step tape feeding mechanism.
Figures 13A, 13B, 13C:
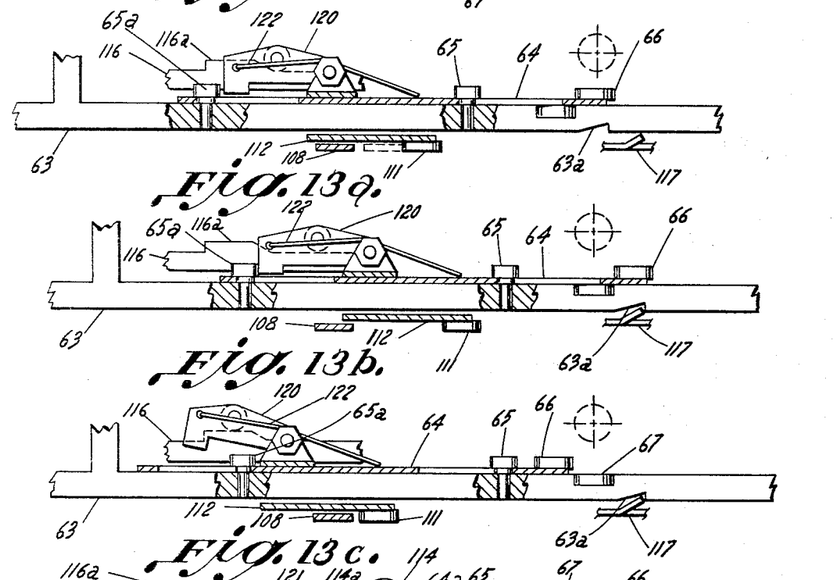
FIG. 13a is a side view of the mechanism shown in FIG. 13 in the embossing position.
FIG. 13b is a side view of the mechanism shown in FIG. 13 in position assumed thereby when the operator of the machine still has a letter or number count left in the machine.
FIG. 13c is a view of the mechanism shown in FIG. 13 in the cut-off position when the operator of the machine has exhausted his count and has decided to cut off the tape.
Figure 13D:
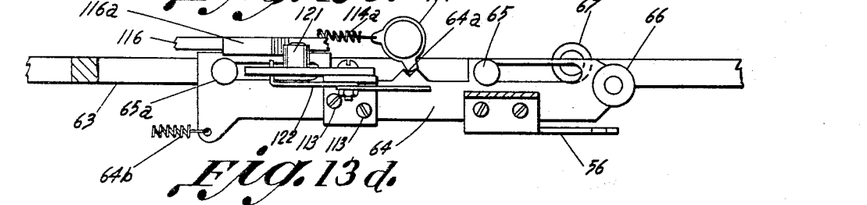

The cut-off bar 63 is provided with a plate 64 which is slidably attached thereto by studs 65 that engage the plate in suitable slots, as shown in FIG. 13d. The upper cam follower 66 is attached to the plate 64 and the lower cam follower 67 is attached to the rod 63. The embossing cam 68 is positioned on the shaft 36 and is slidable on the key 69 so that it rotates with this shaft, as shown in FIG. 7. This embossing cam 68 is provided with a projection 68a and with a small dimple 68b. The projection 68a is adapted to be engaged by the cam follower 66 and the dimple 68b is adapted to be engaged by the cam follower 66a which is supported on the member 56. When these cam followers 66 and 66a engage the embossing cam projections 68a and 68b, respectively, the embossing cam is shifted laterally on the shaft 36 against the tension of spring 36b. When the embossing cam 68 is shifted laterally on the shaft 36, it is positioned under cam follower 31, as shown in FIG. 6. At the same time, a tape feed actuating pawl 70 is allowed to be pulled by the spring 71 into engagement with the ratchet 72, shown in FIGS. 2, 10 and 10a. The pawl 70 is connected to the embossing cam 68 by cable 73, bell crank 74 and cable 75. Thus, one end of the cable 73 is connected to the pawl 70 and the other end thereof is connected to an arm of the bell crank 74, whereas, cable 75 has one end thereof connected to the other arm of bell crank 74 and the other end thereof is connected to the embossing cam 68. The bell crank 74 is pivotally supported by the pin 76 on the plate member 14. The pawl 70 is pivotally supported by the pin 77 on the arm 78 which is in turn pivotally supported by the pin 79 on frame 80, as shown in FIGS. 2 and 3. A cam 81 attached to the shaft 36, shown in FIGS. 3a and 6a, is provided for engaging the arm 78 and moving this arm up and down so that the pawl 70 is moved up and down, thereby rotating the ratchet 72 (FIGS. 2 and 3a).

The ratchet 72 is provided with a rubber roller 82 which engages the bottom of the tape 22, as shown in FIG. 2, and presses the tape against roller 83, thus moving the ratchet 72, thereby feeding tape from the reel 84 (FIGS. 2 and 11). At the same time, as the arm 78 is moved upward by the cam 81, that is, when the lever 37 is pulled downward by the operator, the arm 85 which is attached to the arm 78 by the pin 77, moves the pawl 86 upward out of engagement with the ratchet disc 87 of the tape reel 84, thus allowing the tape to be drawn from the reel 84 by the ratchet roller and roller 83. On the other hand, unauthorized withdrawal of tape from slot 10a is prevented because the pawl 86 is in engagement with the ratchet 87. This thereby prevents the reel 84 from turning more than a limited amount sufficient to shift the lever 88, one end of which is attached by pin 89 to the disc 90 of the reel 84, as shown in FIG. 11. This limited movement of the reel causes the arm or lever 88 to move to the left in FIG. 2. This moves the links 91 and 92 to which lever 88 is pivoted by the pin 93. The rod 94 to which link 92 is pivoted by pin 93 is then moved upward. The upper end of this rod 94 is attached to the plate 35, as shown in FIGS. 2 and 4, so that it moves the plate 35 and the anvil 23 against the knives 20, thereby cutting off the tape.

The reel 84 also comprises a front plate 95, a back plate 96 and the ratchet 87 which is riveted to plate 96, as shown in FIG. 11. These plates are held as a unit on the hub 85 by the nut 97 which is threaded to the hub. The nut 97 presses the outer plate or disc 95 against the tape 22 and in turn presses the tape against the inner disc 96. The hub 85 is supported on the frame bracket 98 by the pin 99. The pin 99 is provided with nuts 100 and 101, nut 100 engaging the outer end of the hub 85 and nut 101 engaging the bracket 98 to retain the hub on the pin and yet permit rotation of the reel thereon.

FIGS. 13, 13a, 13b, 13c and 13d show the cam shifting mechanism in different positions with the FIG. 13 showing it in the neutral position, FIGS. 13a and 13d showing it in the embossing position, and FIGS. 13b and 13c showing it in tape cut-off position. FIG. 13b shows the shifting mechanism in cut-off position when the device still has a count set in the counting ratchet mechanism (FIGS. 12–12b). The views in FIGS. 13–13d may be correlated with the views shown in FIGS. 12–12b as follows: FIG. 13 is the neutral position of the shifting mechanism and FIG. 12 shows the neutral position of the character counting ratchet mechanism; FIG. 13a is the embossing position of the shifting mechanism and FIG. 12a is the embossing position of the ratchet mechanism.

The latching mechanism rod 63 is provided with a knob 63a extending out of the housing 10, as shown in FIG. 3, so that the operator may move the rod 63, as will be presently described, from the outside of the housing. The latching mechanism is shown in neutral position in FIGS. 3 and 13. After a coin is placed in the coin receiver 102 and this is pushed into the housing, the cam follower 103 attached to the coin receiving plate engages the lever 104. One end of this lever is pivoted by pivot pin 105 to the plate 14, as shown in FIG. 3. The other end of the lever 104 is pivotally connected by pin 106 to the arm 107 and the other end of the arm 107 is pivotally connected to the lever 108 by the pivot pin 109. The other end of the lever 108 is pivotally connected by the pin 110 to the plate 14. When the lever 104 is moved forward on its pivot 105, it pulls the arm 107 forward and this arm moves the lever 108 forward so that this lever engages the cam follower 111 attached to the member 112. The member 112 is attached by screws 113 to the plate 64 of the shifting mechanism, as shown in FIG. 13d. Thus the lever 108 engaging the cam follower 111 moves the member 112 and plate 64 forward to the position shown in FIG. 13a which is referred to as the embossing position.

Plate 64 is held in the embossing position by the pawl or lock 114 which is pivotally supported on the pin 115 on the plate 14, as shown in FIG. 4. The lock 114 engages a notch 116 in plate 64a. The lock 114 is provided with a spring 114a, one end of which is attached to the lock and the other end of which is attached to the member 116 and normally holds lock 114 with the locking part thereof pointing in a horizontal position so that when the plate 64 is being moved forward, the locking part of this lock engages notch 64a, whereas, when the plate 64 is being returned, the lock 114 will slide thereover and not lock the plate against this return. The spring 64b is provided to plate 64, one end of the spring 64b being attached to the plate 64 and the other end being attached to a bracket which in turn is attached to the plate 14, as shown in FIG. 3. Thus, when the plate 64 is moved into the embossing position shown in FIGS. 13a and 13d, it is moved against the tension of the spring 64b and is locked in this position by the lock 114 engaging the recess 64a.

Latch 120 is pivotally attached by a shoulder screw to the upper part of bracket 112 which is fastened to the plate 64 by screws 113, as shown in FIG. 13d. Latch 120 is provided with a small roller 121 attached thereto by a suitable pin. This roller 121 engages the cam surface 116a of the yoke 116 when the mechanism is in the neutral position shown in FIG. 13. Also, when the lever 108 engages the cam follower 111 that is attached to the bracket 112, the plate 64 is moved forward to the embossing position shown in FIG. 13a and roller 121 is moved off of the cam surface 116a, as shown in this figure. In this position the tooth 120a of latch 120 is positioned behind stud 65a when the plate 64 is in the embossing position, shown in FIG. 13a, and the cam followers 66 and 66a engage the projection 68a and small dimple 68b of the embossing cam 68, as previously described. Also, at this time the member 56 is brought into engagement with the finger 54 of the ratchet 45, as previously described. A latch 117 is provided for engaging in the notch 63a of the member 63 when this member is pushed into the position shown in FIG. 13b. This latch 117 is supported on pins 118 which support it on plate 14 and it is urged upwardly by springs 119, as shown in FIGS. 4 and 5.

FIG. 13b shows the position of the shifting mechanism after the operator has selected a predetermined number of characters in his label less than the full amount allotted, and he desires to cut off the label. He then passes the knob 63b, bringing the member 63 forward to the position where latch 117 engages in recess 63a, as shown in FIG. 13b. In the embossing position of the shifting mechanism 63, the cam follower 66 is in engagement with the projection 68a of the embossing cam 68, as previously described in connection with FIG. 6. When the mechanism 63 is moved to the position shown in FIG. 13b, the follower 66 is moved beyond the projection 68a of cam 68, and cam follower 67 engages the projection 39a of cut-off cam 39 and follower 67a engages the dimple 39b.

It will be noted that the tooth 120a of the latch 120 was positioned ahead of the stud 65a, as shown in FIG. 13a, as previously described, and accordingly, when the operator moves the rod 63 to shift the mechanism into the cut-off position shown in FIG. 13b, the plate 64 was also carried forward with the rod 63 and the cam followers 66 and 66a were moved away from projection 68a and dimple 68b of the embossing cam 68, shown in FIG. 6.

However, if the operator of this machine used up his entire allotted quota of characters and the machine is returned to its neutral position because of the operation of the ratchet mechanism as previously described, and the operator still desires to add certain letters or numbers to the label that he is preparing in this machine, he could insert another coin in the coin slot 102 and operate the machine as before. On the other hand, if the operator has used up his allotted number of characters and the machine has returned to its neutral position, as described, the operator to cut off the tape and remove the label must push in rod 63 until the latch 117 engages the rod in recess 63a, as shown in FIG. 13c. It will be noted that in this position the rod 63 was moved forward but the plate 64 remained in neutral position since it was held back by spring 64b. It will be noted also that cam followers 67 and 67a were moved to the cut-off position. In this position the cam followers 67 and 67a engage the projection 39a and dimple 39b of the cut-off cam 39 and shift this cam under the cam follower 32. The cam follower 32 is provided with a lip around the circumference thereof and the cam 39 is moved under this lip because of the recess 39c. The operator then pulls lever 37 to cut off the tape. However, before the tape is cut off it is advanced a certain number of positions to provide an end margin on the tape label. This is accomplished by the cam 44 which is attached to the shaft 36 by the pin 43 as shown in FIG. 9a. The cam engages the roller 123 which is pivotally attached to the arm 124. One end of this arm is pivotally attached to a suitable bracket attached to plate 14, and the other end portion of this lever is positioned between rollers 125 and 126 that are attached to the L-shaped member 127, as shown in FIG. 9. In order to keep the lever 124 from moving out from between the rollers 125 and 126, a side plate 128 is provided to the L-shaped bracket 127.

A pawl 129 with six teeth is attached to the bracket 127 by the screw 130 and a spring 131 is provided coiled around this screw. This spring 131 is provided with arms engaging the bracket 127 and pawl 129 to urge this pawl into engagement with the ratchet 132 which is mounted on the same shaft as ratchet 72, as shown in FIGS. 2 and 3. The tape 22 is advanced six positions when the pawl 129 is moved down by the lever 124 and associated mechanism. After the cam 44 moves the lever 124 down, resulting in the feeding of six positions on the tape, the latch 133 engages the pin of roller 125. The latch 133 is held in this position by spring 134 so that said latch holds the lever in its down position until the next operator inserts a coin into the receiver 102 and pushes it inward. At that time lever 104 operated by the coin mechanism 102 is moved back and the projection 104a thereof engages the projection of 133a on latch 133, thereby disengaging it from the pin of roller 125 and allowing the spring 124a to pull lever 124 to its upper position.

A rod 137 which has a bent upper portion resting on the top of the tape 22 is supported by the tape adjacent to feed roller 82. When the supply of tape is exhausted, this rod is dropped down so that the lower end thereof prevents the coin mechanism 102 from being pushed inward, thereby disabling the machine until a new supply of tape is inserted therein and the rod raised to the position shown in FIGS. 2 and 3.

Springs 18b are provided around the upper end of the rod 18 to urge the member 33, which supports the anvil 23, downward. The springs 18b are positioned between the member 33b and the member 25 for this purpose. Spring 86a is provided between the pawl 86, as shown in FIG. 11, and the back plate 90 of the tape reel and functions to urge the pawl 86 into engagement with the ratchet 87. A spring 70a is provided having the upper end thereof attached to the pawl 70 and the lower end attached to the plate 14. This spring functions to pull the pawl 70 down when the arm 78 is moved downward.

The operations of this machine are summarized as follows:

First, the operator of this machine inserts an appropriate coin in the coin receiver 102, shown in FIGS. 1 and 3, and presses the coin carrier inward so that cam follower 103 pushes lever 104 which carries lever 107 forward and moves lever 108 on its pivot 110. Lever 108 engages cam follower 111 and carries plate 64 into its embossing position shown in FIG. 13a. Cam followers 66 and 66a engage the projections 68a and 68b of embossing cam 68 and move this cam under the lip of cam follower 31. Shifting the embossing cam 68 on the shaft 36 allows the pawl 70 (shown in FIGS. 2 and 10a) to engage the sprocket 72 of the tape feeding mechanism shown in FIG. 3.

Next, the operator moves a knob 12 to select the first character of his label. The operator then moves lever 37 downward, thereby rotating the shaft 36 which rotates the cam 39 and this moves the cam follower 32 upward. Follower 32 moves embossing pin 26 upward and this pin presses the tape 22 into the relief of the character selected in member 19, thereby embossing this character in the tape 22.

The lever 37 is movable through an angle of 90 degrees. During the first 45 degrees of this movement the ratchet 72, which causes the tape feeding roller to rotate one increment, is moved by the pawl 70, thereby feeding the tape one position. On the second 45 degrees of the stroke, the embossing operation just described takes place. This operation is repeated each time the operator selects a numeral or letter that he desires to emboss on the tape until he has selected a total of twenty characters, which is the total provided for on the ratchet mechanism shown in FIGS. 12–12c. This mechanism functions as a counter for this purpose.

After the operator has used his maximum allotted number of characters, namely twenty, the ratchet is in a position, as shown in FIG. 12b, in which the pin 57 is engaging the back side of lever 56 attached to the shifting mechanism shown in FIGS. 13–13d. As a result, the plate 64 is moved forward so that the lock 114 shown in FIG. 13d is disengaged from the notch 64a, thereby allowing plate 64 to move back to its neutral position shown in FIG. 13. The operator then moves the shifting mechanism 63–64 into its tape cutoff position by pushing on knob 63b, shown in FIG. 3, to get the machine into the cutoff position in which the member 117 engages in recess 63a and holds the rod 63 in cutoff position, as shown in FIG. 13c. When the rod 63 was moved to this position, it carried the cam followers 67 and 67a forward into engagement with cam 39, causing this cam to be shifted under follower 32 where it is positioned to actuate the tape cutoff. At the same time, the embossing cam 68 is released and spring 36b pushes it to its neutral position. The operator then during the first 45 degrees of movement of lever 37 operates the cam 44, shown in FIGS. 9 and 9a, which moves lever 124 downward and causes pawl 129 to move the tape-feeding ratchet 132 six positions, as previously described, whereby the tape is fed six positions to provide a margin to the label prior to cutoff. Further movement of the lever 37 by the operator then rotates the tape cutoff cam 40 (FIG. 4) which moves the anvil 23 upward and presses the tape 22 against the cutoff knife 20. The cam 40 is rotated by the shaft 36 at the same time as the cam 39 is rotated. Cam 39 pushes the anvil 23 upward against the tape, thereby pressing the tape against the cutoff knife which severs the tape. Rotation of the cam 40, on the other hand, causes the member 117 to be pressed downward and this releases the catch of member 117 from the notch 63a, thereby allowing the bar 63 to return to its neutral position, as shown in FIGS. 3 and 13.

In the foregoing summary of the operation, it was assumed that the operator used all of the 20 characters allotted to him in the preparation of his label. On the other hand, if he did not require the use of the full 20 characters and desired to cut off the label, for example, after using say 15 characters, the operator pushes the knob 63b inward, after embossing this number of characters, to position the shifting mechanism to that shown in FIG. 13b. The shifting mechanism member 56 is caused to engage the member 54 of the shroud, moving the ratchet mechanism to the position shown in FIG. 12b, in which the pawls 47 and 48 are out of engagement with the ratchet 45. Releasing the ratchet allows it to be rotated almost through a complete revolution until the pin 57 engages the member 54. At the same time the cams 44, 39 and 40 are shifted laterally on the shaft 36 so that cams 39 and 40 are in their cutoff position. Also, the embossing cam 68 is shifted to its neutral position by spring 36b. The operator now pulls the lever 37 down to cut off the tape in the maner previously described.

On the other hand, if, after reaching 20 characters on the label being prepared, the operator still desires to continue adding characters to his label beyond the maximum of 20 allowed, he inserts another coin into the coin receiver and presses this inward so that the machine is set up for continued operation, and the operator can then continue to select characters to be added to the label.

While I have shown a preferred embodiment of the invention, it will be understood that the invention is capable of variation and modification from the form shown so that its scope should be limited only by the scope of the claims appended hereto.

What I claim is:

1. In a vending machine for vending labels made on embossed pressure adhesive tape, the combination of a housing, a reel having tape wound thereon, a member having a plurality of characters in relief formed thereon for embossing on a pressure-sensitive tape, tape feeding means engaging said tape, manually operable means for adjusting said member to emboss selected characters on said tape, means for pressing said tape against selected characters on said member, a manually rotatable shaft positioned in said housing and having one end projecting from said housing, embossing cam means, means attaching said embossing cam means to said manually rotatable shaft so that said cam means is rotatable when said shaft is rotated, said attaching means permitting axial movement of said cam means on said shaft, said cam means operating said pressing means when said shaft is rotated, means on said shaft operating said tape feeding means step by step as said tape is embossed, means shifting said embossing cam means on said shaft into its operating position, means controlling said embossing cam shifting means, a coin-receiving member projecting out of said housing, said coin receiving member having means on the inside of said housing activating said shifting controlling means to shift said embossing cam means into its operating position when a coin is inserted therein, said housing having an opening through which said tape is fed out after being embossed.

2. A vending machine for vending labels made on embossed pressure-sensitive tape as set forth in claim 1, further characterized there is provided tape cutoff means, means actuating said cutoff means comprising a cutoff cam, means attaching said cutoff cam to said manually rotatable shaft so that said cutoff cam is rotated when said shaft is rotated, said cutoff cam attaching means permitting axial movement of said cutoff cam on said shaft, said shifting means having manually operable means shifting said cutoff actuating cam on said shaft into its operating position whereby the tape may be cut off by rotating said manually rotatable shaft.

3. A vending machine for vending labels made on embossed pressure-adhesive tape, the combination as set forth in claim 1, further comprising means controlling said shifting means to shift said embossing cam means to its inoperative position after a predetermined number of characters have been embossed on said tape, and means operatively associated with said embossing cam means disabling said tape feeding means when said embossing cam means is shifted to its inoperative position.

4. A vending machine for vending labels made on embossed pressure-sensitive tape, as set forth in claim 1, further comprising means operatively associated with said cutoff means comprising means feeding said tape a plurality of steps to provide a margin thereto prior to cutting off of said tape by said cutoff means.

5. In a vending machine for vending labels made on embossed pressure adhesive tape, the combination of a housing, a reel having tape wound thereon, a member having a plurality of characters in relief formed thereon for embossing on a pressure-sensitive tape, manually operable means for adjusting said member to emboss selected characters on said tape, means for pressing said tape against selected characters on said member, a manually rotatable shaft positioned in said housing and having one end projecting from said housing, embossing cam means slidable on said shaft operating said pressing means, means shifting said embossing cam means on said shaft into its operating position, means controlling said shifting means, a coin-receiving member projecting out of said housing and having means on the inside of said housing actuating said shifting controlling means to shift said embossing cam means into its operating position when a coin is inserted therein, said shifting means comprising a rod slidably mounted in said housing, a plate slidably mounted on said rod and means attached to said plate engaging said embossing cam and shifting it to its operating position on said shaft, said housing having an opening through which said tape is fed out after being embossed.

6. A vending machine for vending labels made on embossed pressure-sensitive tape as set forth in claim 5, further characterized in that said shifting means comprises locking means for locking said plate and said rod together when said shifting means is advanced to its embossing position, said rod having means for shifting said cutoff cam to its operating position, means for latching said rod when it is advanced to its cutoff position so that it holds said cutoff cam in its operating position on said shaft whereby said cutoff cam may be operated by said shaft to actuate tape cutoff means, a pair of pawls, a ratchet rotatably mounted.

7. A vending machine for vending labels made on embossed pressure-sensitive tape as set forth in claim 6, further characterized in that said ratchet is provided with a pin, said pin moving said plate when said ratchet is advanced a predetermined number of steps to release said shifting means from its embossing position is advanced to its tape cutoff position.

8. A vending machine for vending labels made on embossed pressure-sensitive tape, as set forth in claim 5, further comprising a ratchet rotatably mounted on said shaft, a pair of pawls, a shroud for said ratchet mounted on said shaft to hold said pawls out of engagement with said ratchet, spring means attached to said shroud to permit said pawls to engage said ratchet when said shifting means is advanced to its embossing position so that said pawls will rotate said ratchet step by step as said tape is embossed, and means returning said ratchet to its starting position after a predetermined number of characters have been embossed on said tape.

9. In a coin-controlled letter embossing device, the combination comprising a character-embossing member positioned in a housing, means for feeding embossing tape to said character-embossing member, means for selecting the character to be embossed on said tape, a coin-receiving member projecting out of said housing, a shaft positioned in said housing and having one end thereof extending out of said housing, a lever attached to the outer end of said shaft for rotating said shaft, an embossing cam and a cutoff cam rotatable on said shaft, said cams also being shiftable on said shaft to their operating positions, cam-shifting means, means operable by said coin-receiving member for shifting said shifting means and causing it to move said embossing cam to the embossing position, means engaged by said embossing cam for pressing said tape against the selected character of said character-supporting member when said embossing cam is rotated by said shaft, said tape feeding means being operative by said shaft and said lever for feeding tape step-by-step to said embossing member as said lever is operated, a ratchet mechanism mounted on said shaft, said ratchet mechanism having means for step-by-step advancement thereof as said embossing cam is operated for each operation thereof, said ratchet mechanism having means for controlling said shifting means after a predetermined number of operations of said ratchet mechanism to cause said shifting means to release said embossing cam, said shifting means having means engaging said cutoff cam and shifting it to its operating position, means for cutting off said tape, and means operable by said cutoff cam for operating said tape cutoff means when said cutoff cam is shifted to its operating position and said shaft is rotated.

10. A coin-controlled letter embossing device as set forth in claim 9, further characterized in that said shifting means comprises a bar and plate means slidably attacher thereto, said plate means having cam-engaging means for moving said embossing cam to the embossing position and said rod having cam-engaging means for moving said cutoff cam to the tape cutoff position.

11. A coin-controlled letter embossing device as set forth in claim 10, further characterized in that said ratchet is provided with a recessed shroud, a pair of pawls extending into said shroud through the recesses to engage said ratchet when said shifting means is moved to the embossing position and said shroud is rotated by said plate means, one of said pawls being fixed to said shaft for rotating said ratchet step-by-step as said embossing cam is operated during the embossing operation, means for locking said plate means and said bar together during the embossing operation, manual means disengaging said embossing cam-engaging means and engaging said cutoff cam preparatory to tape cutoff and prior to utilizing the predetermined number of operations of said ratchet mechanism, said manual means also shifting said plate means thereby rotating said shroud to disengage said pawls from said ratchet and allowing it to return to its neutral positions and means for advancing said tape feeding means several positions preparatory to cutoff of the tape.

12. In a vending machine for vending labels made on embossed pressure adhesive tape, the combination of a housing, reel having tape wound thereon, a member having a plurality of characters in relief formed thereon for embossing on a pressure-sensitive tape, manually operable means adjusting said member to emboss selected characters on said tape, means pressing said tape against selected characters on said member, a manually rotatable shaft positioned in said housing and having one end projecting from said housing, embossing cam means shifting said embossing cam means on said shaft into its operating position means controlling said shifting means, a coin-receiving member projecting out of said housing and having means on the inside of said housing actuating said shifting controlling means to shift said embossing cam means into its operating position when a coin is inserted therein, cutoff means positioned to engage said tape following said tape pressing means, and means on said shaft actuating said tape cutoff means, said housing having an opening through which said tape is fed out after being embossed, said reel having means to prevent unauthorized withdrawal of tape therefrom, said last mentioned means including means for actuating said cutoff means when tension is applied to said tape at said tape-feeding opening.

13. In a vending machine for vending labels made on embossed pressure adhesive tape, the combination of a housing, a reel having tape wound thereon, a member having a plurality of characters in relief formed thereon for embossing on a pressure-sensitive tape, manually operable means for adjusting said member to emboss selected characters on said tape, means for pressing said tape against selected characters on said member, a manually rotatable shaft positioned in said housing and having one end projecting from said housing, embossing cam means slidable on said shaft operating said pressing means, means shifting said embossing cam means on said shaft into its operating position, means controlling said shifting means, a coin-receiving member projecting out of said housing and having means on the inside of said housing actuating said shifting controlling means to shift said embossing cam means into its operating position when a coin is inserted therein, tape cutoff means positioned to engage said tape adjacent said tape pressing means, means on said shaft actuating said tape cutoff means, a ratchet mounted on said shaft, said ratchet having a predetermined number of teeth, means attached to said shaft for advancing said ratchet one tooth each time a character is embossed on said tape, said means actuating said cutoff means comprising a cam on said shaft, and manually operated means conditioning said cutoff cam for operation by said shaft whereby said cutoff cam is actuated by said shaft to operate said tape cutoff means when said shaft is rotated, said housing having an opening through which said tape is fed out after being embossed.

14. In apparatus for dispensing embossed tape, the combination of a supply of tape, embossing means, means actuating said embossing means for embossing characters in sequence on said tape, a ratchet mechanism controlling the maximum number of characters that may be embossed on said tape in a cycle of operation, said ratchet mechanism comprising a ratchet, means conditioning said embossing actuating means for operating said embossing means, said last mentioned means also conditioning said ratchet mechanism for rotation of said ratchet step by step as said characters are embossed on said tape, means returning said ratchet to its starting position after said selected number of characters is embossed on said tape so that said ratchet is positioned for another cycle of operation in which another selected predetermined number of characters may be embossed on said tape, and means controlled by said ratchet mechanism as said ratchet mechanism is returned to its starting position disabling said conditioning means.

15. In apparatus for dispensing embossed tape, the combination of a supply of tape, embossing means means actuating said embossing means for embossing characters in sequence on said tape, a ratchet mechanism controlling the maximum number of characters that may be embossed on said tape in a cycle of operation, said ratchet mechanism comprising a ratchet, means conditioning said embossing actuating means for operating said embossing means, said last mentioned means also conditioning said ratchet mechanism for rotation of the said ratchet step by step as said characters are embossed on said tape, manually actuated means for resetting said ratchet to its starting position after a selected number of characters which is less than said predetermined number have been embossed on said tape, said last mentioned means including means enabling a tape cutoff means for operation and means operating said tape cutoff means to cut off the portion of said tape on which said characters have been embossed.

References Cited

UNITED STATES PATENTS

| | | | |
|---|---|---|---|
| 687,168 | 11/1901 | Roovers | 197—6.7 |
| 716,064 | 12/1902 | Lavery | 197—6.7 |
| 750,432 | 1/1904 | Casler et al. | 197—6.7 |
| 760,694 | 5/1904 | Lavery | 197—6.7 |
| 811,783 | 2/1906 | Lavery | 197—6.7 |
| 923,143 | 6/1909 | Colwell | 197—193 X |
| 1,494,839 | 5/1924 | Heene | 197—6.7 |
| 1,702,811 | 2/1929 | Butler | 197—6.4 |
| 1,790,562 | 1/1931 | Wetmore | 197—6.4 |
| 3,133,495 | 5/1964 | DeMan | 197—6.7 X |

WILLIAM B. PENN, *Primary Examiner.*

ROBERT E. PULFREY, *Examiner.*

E. S. BURR, *Assistant Examiner.*